United States Patent
Ahsan et al.

(10) Patent No.: US 9,011,573 B2
(45) Date of Patent: Apr. 21, 2015

(54) PROCESS FOR RECYCLING OF STEEL INDUSTRY IRON BEARING BY-PRODUCTS, PELLET OBTAINED IN THAT PROCESS AND USE THEREOF

(75) Inventors: Syed Niaz Ahsan, Al-Jubail (SA); Fazal-Ur-Rehman Awan, Al-Jubail (SA); Ali Al-Hazemi, Al-Jubail (SA); Fawzi Al-Dulaijan, Al-Jubail (SA)

(73) Assignee: Saudi Basic Industries Corporation, Riyadh (SA)

( * ) Notice: Subject to any disclaimer, the term of this patent is extended or adjusted under 35 U.S.C. 154(b) by 1289 days.

(21) Appl. No.: 12/227,654

(22) PCT Filed: May 24, 2007

(86) PCT No.: PCT/EP2007/004611
§ 371 (c)(1),
(2), (4) Date: Jan. 12, 2009

(87) PCT Pub. No.: WO2007/134859
PCT Pub. Date: Nov. 29, 2007

(65) Prior Publication Data
US 2009/0169413 A1    Jul. 2, 2009

(30) Foreign Application Priority Data
May 24, 2006 (EP) .................................. 06010626

(51) Int. Cl.
*C21B 13/14* (2006.01)
*C22B 1/24* (2006.01)
(Continued)

(52) U.S. Cl.
CPC ............ *C22B 1/2413* (2013.01); *C21B 13/0046* (2013.01); *C21B 13/02* (2013.01); *C22B 1/243* (2013.01); *C22B 5/12* (2013.01); *C22B 7/02* (2013.01); *C21B 2200/00* (2013.01); *C22B 19/30* (2013.01)

(58) Field of Classification Search
USPC ............................................ 75/436; 148/579
See application file for complete search history.

(56) References Cited

U.S. PATENT DOCUMENTS

| 3,003,864 A | 10/1961 | Kraner et al. |
| 3,420,656 A | 1/1969 | Mekler et al. |

(Continued)

FOREIGN PATENT DOCUMENTS

| DE | 2645551 A1 | 4/1977 |
| GB | 2 043 613 A | 10/1980 |

(Continued)

OTHER PUBLICATIONS

German Patent No. 2645551 (A1); Publication Date: Apr. 21, 1977; Machine Translation; 9 Pages.

(Continued)

*Primary Examiner* — Rebecca Lee
(74) *Attorney, Agent, or Firm* — Cantor Colburn LLP

(57) ABSTRACT

The present invention relates to a process for the recycling of steel industry iron bearing by-products into a shape suitable for feeding into a direct reduction furnace, comprising the steps of mixing and grinding 50 to 99 wt % of ore and pellet fines and 1 to 50 wt % of slurry, mill scale and/or bag house dust, pelletizing the mixture and indurating the pellets so obtained by heating for 5-60 minutes at a temperature in the range of 1100-1350° C.; and a pellet produced from Iron bearing waste material and having compression strength of at least 2.8 kN and/or a drop number of at least 3.

12 Claims, 6 Drawing Sheets

(51) Int. Cl.
 *C21B 13/00* (2006.01)
 *C21B 13/02* (2006.01)
 *C22B 1/243* (2006.01)
 *C22B 5/12* (2006.01)
 *C22B 7/02* (2006.01)
 *C21D 9/00* (2006.01)
 *C22C 38/00* (2006.01)
 *C22B 19/30* (2006.01)

(56) References Cited

U.S. PATENT DOCUMENTS

| 3,432,287 | A | 3/1969 | Greaves et al. |
| 3,975,182 | A | 8/1976 | Goetzman |
| 4,597,790 | A | 7/1986 | Matsui et al. |
| 7,698,966 | B2 | 4/2010 | Gosselin |
| 2005/0092130 | A1 | 5/2005 | Golberger et al. |

FOREIGN PATENT DOCUMENTS

| WO | WO 97/45561 | | 12/1997 |
| WO | WO 00/50649 | A | 8/2000 |
| WO | WO 01/00930 | A1 | 1/2001 |
| WO | WO 03/002775 | A2 | 1/2003 |
| WO | 03050639 | A1 | 6/2003 |
| WO | WO 03/056039 | A1 | 7/2003 |
| WO | 2007134859 | A2 | 11/2007 |

OTHER PUBLICATIONS

Extended European Search Report; European Application No. 06010626.7; Date of Mailing: Nov. 24, 2006; 59 Pages.

International Search Report; International Application No. PCT/EP2007/004611; International Filing Date: May 24, 2007; Date of Mailing: Jan. 22, 2008; 8 Pages.

Written Opinion of the International Searching Authority; International Application No. PCT/EP2007/004611; International Filing Date: May 24, 2007; Date of Mailing: Jan. 22, 2008; 11 Pages.

Bandeira De Mello et al.; 25 Years of Pelletizing at CVRD; 1996 Ironmaking Conference Proceedings; pp. 503-512; 1996.

Cano et al.; "Development of direct reduction pellets containing MgO by Samarco Mineracao S/A"; Mining Engineering; Jun. 1993; pp. 633-636.

Decision of Opposition for European Patent Application No. 07725511.5; (Patent No. EP2035590); Date of Issue Jul. 7, 2014; 6 pages.

Fournier et al.; "Blast Furnace and direct Reduction Pellet Quality Maximization at Quebec Cartier Mining Company";ICSTI/Ironmaking Conference Proceedings; 1998; pp. 979-986.

Meyer; "Pelletizing of Iron Ores"; Springer-Verlag Berlin Heidelberg New York; 1980; 160 pages.

Opposition Under Article 99 EPC for European Patent Application No. 077255115.5 (Patent No. EP 2035590 B1); Date of Issue Aug. 13, 2012; 8 pages.

Sabanero et al.; "Production of High Quality DR Grade Pellets at IMEXSA"; Skillings Mining Review of Dec. 11, 1999; pp. 4-8.

Skillings; "Samarco's Iron Ore Operations at Alegria and Ponta Ubu"; Skillings Mining Review of May 4, 1996; pp. 4-8.

Statement of Grounds of Appeal for European Patent Application No. 07725511.5; (Patent No. EP2035590); Date of Issue Nov. 6, 2014; 8 pages.

Zinyagin et al.; "Iron Production—Bringing Technology on Stream at Okol'sk Electrometallurgical Works for Producing Pellets by Use of Rolling Scale"; Steel in Translation; vol. 29, No. 4; 1999; pp. 1-4.

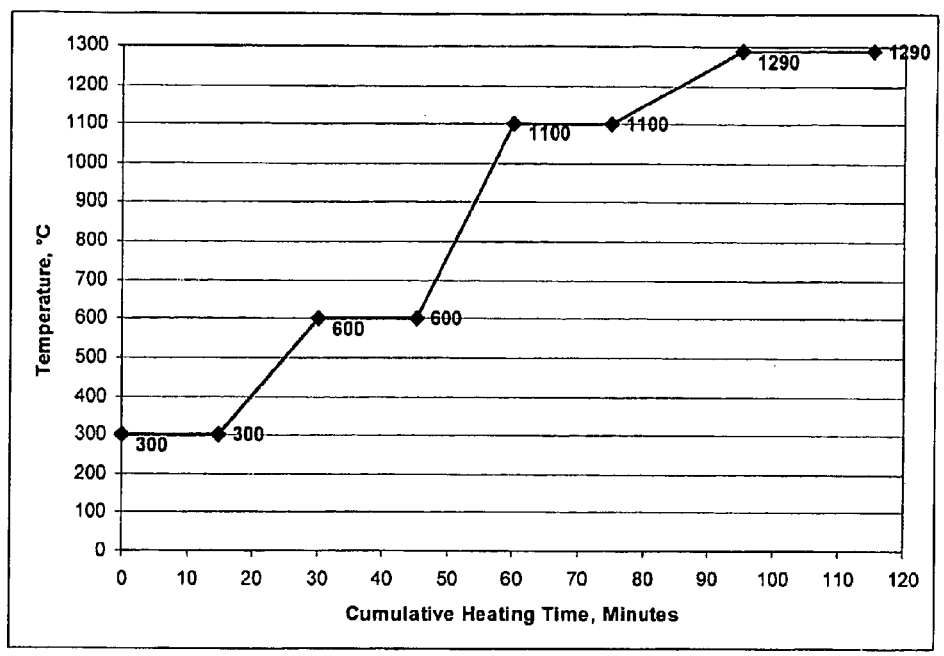
Fig. 2a: Pellet induration conditions for samples 1-10 containing BHD and sample 11-17 that contained no BHD

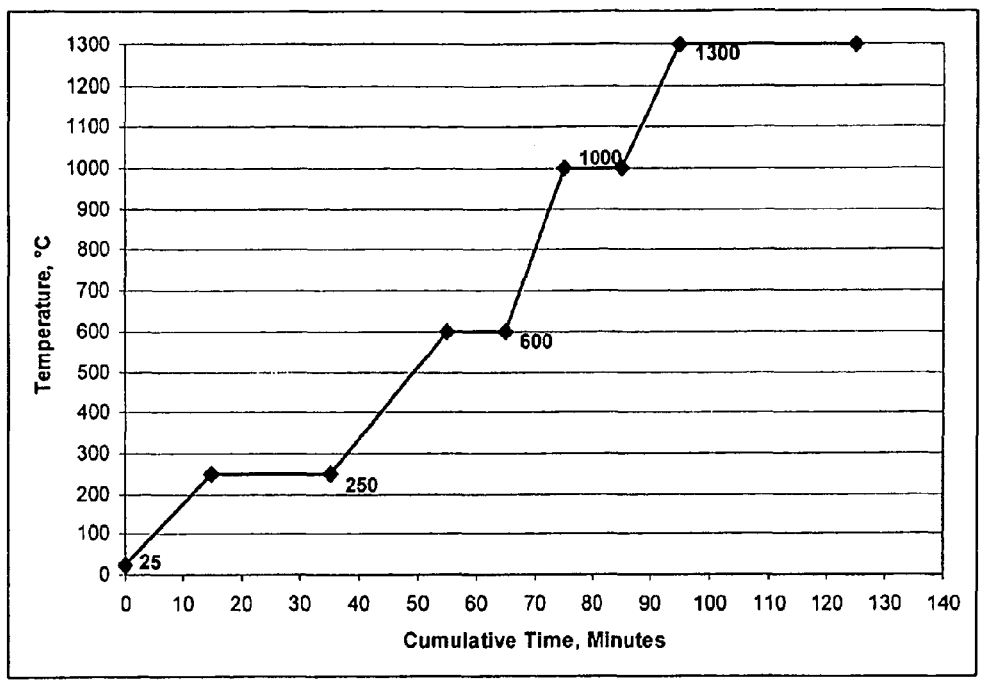
Fig. 2b: Pellet induration conditions for samples containing no BHD

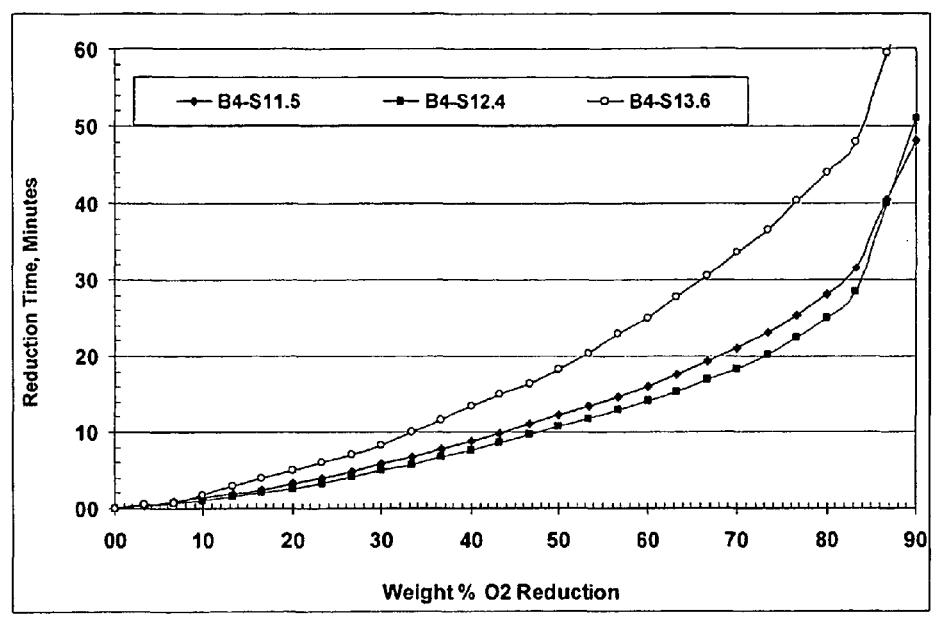
Fig. 3: Reduction behaviour of samples 11-13

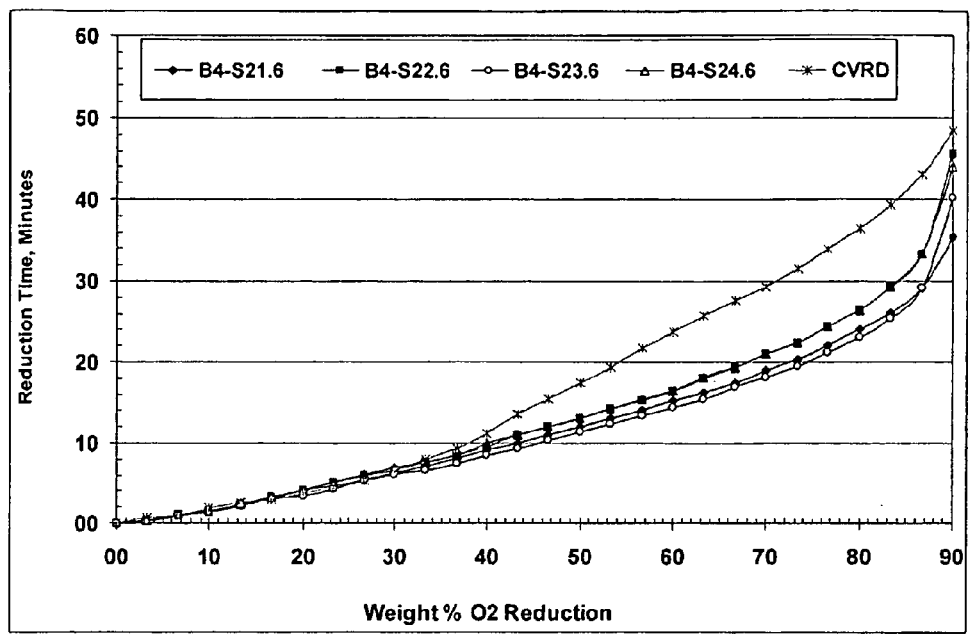
Fig. 4: Comparison of Reduction Behaviour of Samples 21-24 with that of CVRD.

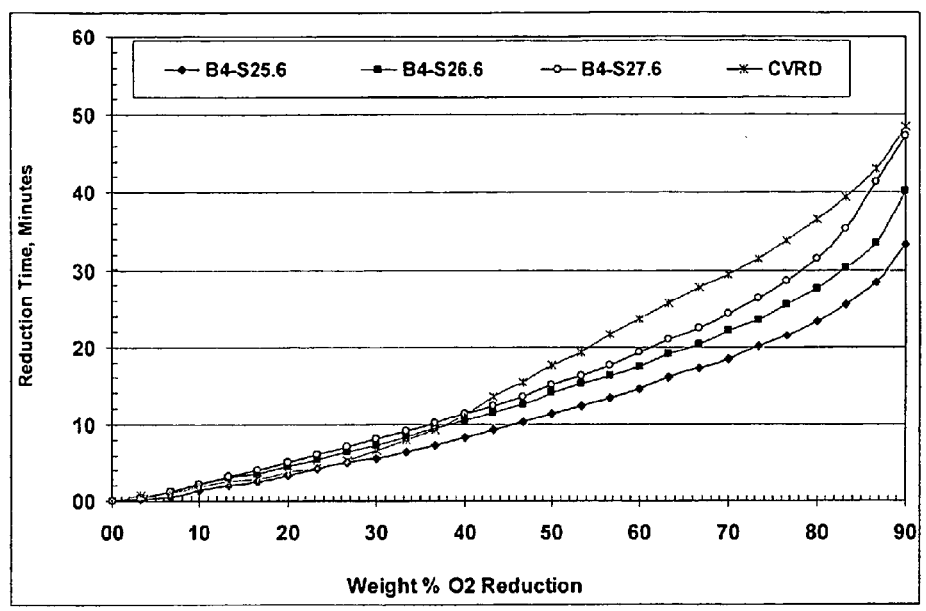
Fig. 5: Comparison of Reduction Behaviour of Samples 25-27 with that of CVRD.

PROCESS FOR RECYCLING OF STEEL INDUSTRY IRON BEARING BY-PRODUCTS, PELLET OBTAINED IN THAT PROCESS AND USE THEREOF

The present invention relates to a process for recycling of steel industry iron bearing by-products in a shape suitable for feeding into a gas based direct reduction furnace, pellets obtained in that process and the use thereof.

The disposal of industrial waste is a common problem all over the world. The cost of disposal of waste materials, either hazardous or non-hazardous, increases due to the stringent requirements from national and international environmental protection agencies. This has led the industries to work for minimization of the waste generation or their re-utilization through efficient processing.

Today, steel plants are world-wide concerned about the handling, storage and safe disposal of their waste materials. Some of the materials are, therefore, to be disposed of very cheaply, e.g. to cement industries. These materials include non-hazardous iron-bearing wastes such as iron oxide fines and mill scale from integrated plants. Electric arc furnace bag house dust (BHD) which is listed as a hazardous material (KO61) by environmental protection agencies can cost up to about \$200 per ton to be thermally processed or stabilized before being sent for landfill. However, many of these on-site landfills are filling up and coming under increased scrutiny by environmental authorities. Due to closure of on-site landfills, steel mills worldwide have stockpiled wastes on site for years, some even decades. Steel industry pays also fee of about \$50-150 for processing of BHD for the recovery of Zn through the known Waeltz kiln process.

Many steel companies use a direct reduction process for the production of directly reduced iron (DRI), e.g. MIDREX® & HyL direct reduction processes. The electric arc furnace (EAF) route is then used for the production of steel. Currently, a large quantity of iron bearing by-products is generated during DRI production, electric arc furnace steel making, casting and rolling operations at the steel producing companies.

The waste materials have in general the following impact on the product and process:
  Reduction in metallic yield at different stages of production
  Increase in total cost of steel production
  Generate environmental concerns
  Problem of long term storage.

There are in fact limited options available to get rid of ever increasing piles of waste materials in steel industry. Most of these options are expensive and site specific. In the following various available options are reviewed in brief.
  a. Landfill
  Landfill is an expensive option due to the reason that bag house dust (BHD) has to be stabilized before it is sent to the landfill. Usually, steel industry has to pay worldwide about \$50 to 250 per ton of BHD for land filling.
  b. Sale of Waste Materials to Cement and Other Industries
  Sometimes, it is possible to sell small proportion of iron oxide fines and mill scale to cement industry at a nominal price of about US \$15-30 per ton. Of course, paying for the disposal of by-products is capital intensive and results in higher operating costs.
  c. Direct Reduction of Iron Bearing Fines in Shaft Furnaces
  Fine iron or reduction technologies such as FINMET® and CIRCORED® can only process ore and pellet fines. Both of these are gas based and use iron oxide fines only as a raw material. Other waste material cannot be utilized by these technologies. FASTMET® and FASTMELT® may utilize most of the waste materials, but these technologies are coal based and not very well established and also not suited for gas based countries. The quality of DRI produced is not good due to high sulphur content. The cost of processing this DRI is relatively high due to the fluxing requirement and prolonged operations in downstream steel making processes.

Further, the environmental agencies are imposing more stringent requirements. FASTMET/FASTMELT® are coal based processes so that they are to be considered as being more sensitive to environment. Thus, additional investments for environmental protection due to the issues that are associated with coal based technologies are required.
  d. Recovery of Zn
  Commonly, the Waeltz kiln technology is used for the recovery of zinc from BHD only. Other by-products cannot be utilized in this process. Further, the process is not economical due to the low amount of BHD usually generated at steel producing companies and the low quantity of Zn in the BHD. Therefore, the recovery of zinc is not feasible and also other waste materials cannot be utilized in this option.
  e. Sintering
  Sintering of iron oxide agglomerates to produce sintered lumps is applicable only to blast furnace processes of iron making. It is used to produce an agglomerate cake from a blend of iron oxide fines with binder and coke at temperatures in excess of 1200° C. The material thus produced is charged to blast furnace after cooling to produce pig iron after reduction, melting and slag formation. Sintering process is an integral part of iron making through the Blast Furnace route and thus provides a chance for recycling of all iron containing by-products such as slurry, mill scale and BHD, in addition to fine iron ore. However, due to the presence of coke and large amount of binder and the shape and mechanical properties of the agglomerates this process cannot be used for the production of waste based feed material for direct reduction furnaces e.g., MIDREX® and HYL, which account for nearly 70-80% of world iron produced through direct reduction route.

Until now there is not known a process to recycle the iron bearing waste materials from Direct Reduction Iron plants into a proper co-feedstock for plants using a MIDREX® or HyL process. These processes have to be fed with pellets meeting severe technical and compositional requirements. At least 94% of the pellets must have a size between 8-18 mm; at most 6% may be smaller. The crushing strength, also called compression strength, of a 12 mm pellet must be at least 280 kg (2.8 kN). The Tumble Index of the pellets must be such that after tumbling the pellets in a 1 m diameter drum for a prescribed time at least 92% is still over 6.3 mm. When exposed to higher temperatures disintegration (also called bursting or spalling) of the pellets must be limited. ISO 11257-1998(E) requires that on exposure to a temperature of 760° C. at most 4% of particles below 3.15 mm may be formed. Further the iron content must be at least 64%.

Iron ore pellets meeting the requirements as basic feedstock for DRI plants are commercially available, e.g. from Companhia Vale do Rio Doce (CVRD pellets) and from the LKAB group of Sweden. Comparable pellets from recycled iron bearing waste are not available.

Sintering Process can recycle iron bearing waste material by converting them in suitably sized material for feeding into the more common blast furnaces. The sintered material cannot be compared to pellets as defined above, and are not suitable as feedstock for DRI plants of the mentioned types.

WO 03/002775 discloses a method for treating only flue gas dusts of electric furnaces and mill scale of rolling mills. These dusts are mixed with iron oxides dust and a carbonaceous compound, pelletized and sintered. The material is charged to shaft furnace, which utilizes coke, to produce Pig Iron after reduction and melting. No conditions of sintering are mentioned. This product is unsuitable for feeding into a gas based direct reduction furnace.

WO 03/050639 discloses a process that recycles only the dust and sludge to produce Pig Iron through a coal based reduction and melting furnace (COREX). Thus unsuitable for feeding into a gas based direct reduction furnace.

GB-A-2043613 discloses a process for producing agglomerates by kneading of Iron Oxide Fines and Reduced Iron Fines (DRI) with water forming the mixture into agglomerates. The agglomerates are hardened by oxidation of the iron fines at low temperatures. These agglomerates are charged into DR iron making unit. The quality of the agglomerates does not meet the ISO 11257 and ISO 4698 standards required for charging the agglomerates into gas based direct reduction furnaces like in MIDREX® and HyL plants.

U.S. Pat. No. 4,597,790 discloses a process for producing agglomerates mill scale and powdered iron (DRI) by cold bonding (briquetting). These agglomerates are intended for use in the consecutive steel making step rather than in the DRI making step. This method is not suitable to obtain suitable quality agglomerates from mixtures of all types of iron production waste materials for feeding into a Direct Reduction furnace such as in MIDREX® & HyL plants.

It is an object of the present invention to provide a process for producing pellets from steel industry iron bearing by-products that are suitable for feeding into MIDREX® & HyL direct reduction process plants. Especially a process shall be provided overcoming the environmental problems incurred with the prior art in a cost effective manner.

This object is achieved by a process for the recycling of steel industry iron bearing by-products into a shape suitable for feeding into a direct reduction furnace, comprising the steps of:
  i. mixing and grinding 50 to 99 wt % of ore and pellet fines and 1 to 50 wt % of slurry, mill scale and/or bag house dust,
  ii. pelletizing the mixture,
  iii. indurating the pellets obtained by heating these for 5 to 60 minutes at a temperature in the range of 1100 to 1350° C.

It was found that the process according to the invention produces pellets that meet the requirements (a.o. standards ISO 11257 and ISO 4698) for pellets to be fed into gas based Direct Reduction furnaces as e.g. in MIDREX® and HyL plants. Preferably the by-products contain 48 to 97 wt % of ore and pellet fines, 1 to 50 wt % of slurry, 1 to 50 wt % of mill scale and 1 to 50 wt % of bag house dust, the total of the components adding up tot 100 wt %.

Preferably, the furnace is a direct reduction shaft furnace.

The process may preferably comprise the additional step of (v) reducing the pellets in the direct reduction furnace to obtain directly reduced iron. The obtained iron is ready for further processing.

Most preferably, the process comprises the additional step of (vi) collecting by-products during reduction and further processing and feeding thereof at step (i).

Another object of the invention is also a pellet and a direct reduced iron obtained in the inventive process and the use of the pellet as feed material for a direct reduction furnace.

The present invention solves the environmental problem associated with the prior art, by finding a new use of steel industry waste materials. Advantageously, the process provides a secondary source of raw material for direct reduction plants and may utilize all iron bearing waste materials. The inventive process recovers iron units and reduces the cost of DRI and steel production. Further, the process reduces the cost of steel making by utilizing waste materials.

In a further preferred embodiment the zinc content of the BHD (Bag House Dust) which is recycled in the process may be increased for the following reasons. Nearly half of the ZnO amount charged is reduced to zinc during reduction, which evaporates and goes to slurry with exhaust gases. The balance remains in the directly reduced iron (DRI) and all of this zinc will evaporate during EAF steel making and therefore enrich BHD with ZnO. The BHD will be recycled in the inventive process to form pellets which are then introduced into the direct reduction furnace. Due to this recycling process, the Zn content of BHD may be increased. Once the Zn content of BHD exceeds 30%, this adds value to the BHD by-product. This lot may then be removed and sold to zinc manufacturers as raw material for zinc recovery.

The inventive process includes therefore recycling of iron bearing waste material into direct reduction furnaces after production of good quality pellets. This includes mixing and grinding of various types of iron bearing material in various proportions and pelletization of these materials followed by induration by firing and as an additional step charging the furnace. A small amount of binder, e.g. less than 3 wt % may be added to the mixture. It was found that a binder content of even 1.5 wt % or less gives excellent pellets.

The waste material usually will be available in different shapes and sizes. It was found that grinding the waste materials to obtain ground mixture of which at least 80% of the particles have a size of less than 100 micron, preferably of less than 75 micron resulted in the highest quality pellets.

Methods for the pelletization of iron and other ores' fines are known in the art, e.g. ball formation on a rotary disc or in a balling drum are suitable to form the pellets in the process according to the invention. However, pelletization, in contrast to making agglomerates under pressure of steel industry iron bearing by-products such as iron oxide fines, bag house dust, mill scale and slurry has not been reported so far.

The pellets thus obtained are of very high quality, conforming to ISO standards relevant for direct reduction processes such as MIDREX® and HyL.

Additional advantages and features of the present invention are further illustrated with reference to the accompanying drawings wherein FIG. 1 illustrates a flow chart describing the steps involved in the process of the present invention;

FIG. 2a shows pellet induration conditions for samples 1 to 10 containing BHD and samples 11-17 containing no BHD;

FIG. 2b shows the pellet induration conditions for samples 21 to 27;

FIG. 3 shows a graph illustrating the reduction behavior of samples 11-13;

FIG. 4 shows a comparison of the reduction behavior of samples 21-24 with that of CVRD; and FIG. 5 shows a comparison of the reduction behavior of samples 25-27 with that of CVRD.

Figure 1:
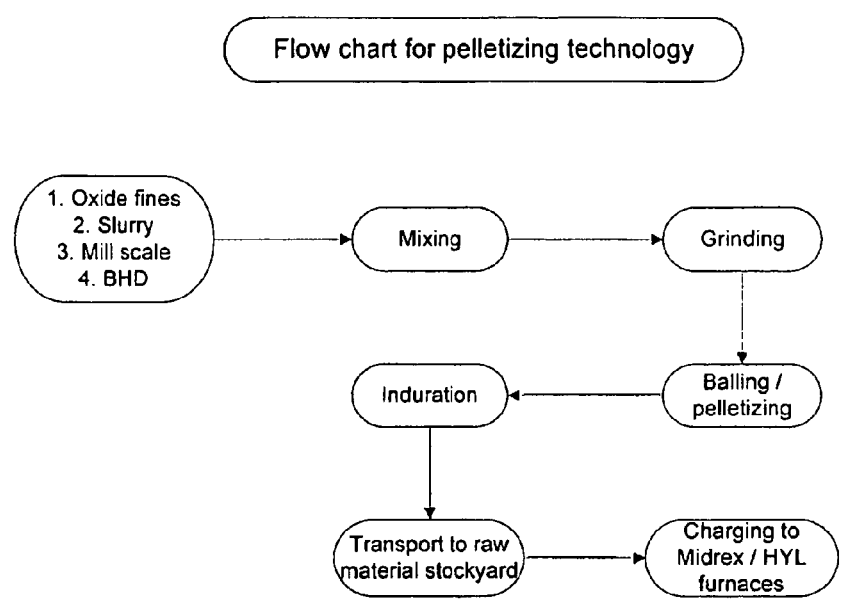

As already outlined, the inventive process starts with mixing of various steel industry iron bearing by-products which comprise ore and pellet oxide fines (preferably smaller then 6 mm), in combination with slurry, mill scale and/or bag house dust in the desired proportions. This mixture is ground by dry or wet grinding methods, so that 80% of the ground material has less than 100, preferably less than 75 micron size. This is followed by pelletizing/balling of the mixture as described above and induration by firing in either a rotary drum or a travel grate or steel belt type furnace to obtain pellets as also shown in FIG. 1. This firing even with the low amounts of binder and the presence of all types of waste materials has been found to produce pellets having high compression strength, well over the required minimum of 2.8 kN, even over 3.0 and even 3.5 kN.

The firing temperature should for at least part of the firing process be above 1000° C. Preferably the temperature is for at least 5 minutes above 1100° C., more preferably above 1200° C. up to 1350° C. Preferably the temperature is above the defined values for at least 10, more preferably at least 15 minutes. Firing for more than 60 or even 45 or 30 minutes in general appeared to have no added value.

Optionally, the indurated pellets may be transported to a raw material stockyard, but may be also directly charged to a direct reduction furnace, such as MIDREX®/HyL furnaces.

Various tests of the inventive process have been carried out based on varying mix proportions of the iron bearing by-products. The tests included green strength, cold compression strength of indurated pellets and tests for metallurgical properties including static reduction, dynamic reduction and testing of reduction and disintegration behavior by charging the hard and soft baskets of these pellets into a direct reduction furnace.

The study involved lab and bench scale tests and on-line basket testing of the pellets obtained in a direct reduction shaft furnace. The optimization of pelletization characteristics of mixtures of oxide fines, bag house dust, mill scale and slurry, and the reduction properties of these pellets have been conducted using various temperature regimes and other processing parameters. FIG. 2 demonstrates typical heating regimes for induration of various pellets. The pellets of DRI grade have been successfully produced and the processing parameters for the various mixed proportions had been optimized to produce good quality pellets from these mixtures. 25 mixtures of ore-pellet fines, BHD, mill scale and slurry have been tested. The mixed proportions of the various samples prepared are disclosed in Table 1 below. The mechanical properties of the pellets such as drop number and compression strength of indurated pellets have been given in table 2 below. The drop number indicates the strength of green pellets as the number of times the green pellet can be dropped from 40 cm height until it breaks. The drop number of pellets obtained with the process of the invention is at least 5, preferably at least 10 and more preferably at least 15. The compression strength is measured on a 12 mm pellet by compressing it until it breaks.

After optimization, all samples 1-10, 18 and 21 to 27 (table 1 below) had good mechanical properties. Out of these samples mixtures comprising samples 5, 6, 9 and 21 to 27 (according to table 1 below disclosing the mixed proportions) showed very good overall results that included physical, mechanical and metallurgical properties. Sample 11 which has similar composition to that of sample 21 did not show properties as good as that of sample 21. This can be explained as the heating/induration regimes of both samples were different. In the case of sample 11, heating regime was used as given in FIG. 2a, whereas in sample 21 the optimized heating regime as shown in FIG. 2b was used. FIGS. 3 to 5 present comparison of the weight percent reduction in $O_2$ as a function of time, for selected samples (containing no BHD) with commercially available iron ore CVRD pellets. It shows that the pellets according to the invention show even better reducing properties than the pure iron ore pellets. Sample 13 showed the slowest reduction followed by sample 27. Samples 11 and 25 showed the fastest reduction after LKAB pellets. In all the examples containing BHD that have been tested, the blend in sample 9 (containing 65 weight percent oxide fines, 15 weight percent slurry, 15% BHD and 5% mill scale) demonstrated the best results.

As "binder" in the examples of Table 2 commercially available "Bentonite" was utilized, however, any other commercially available binder can be used.

The features disclosed in the foregoing description, in the claims and in the drawings may, both separately and in any combination thereof, be material for realizing the invention in diverse forms thereof.

TABLE 1

Typical mix proportions of various samples

| Sample # | Oxide Fines <6 mm | Slurry | Mill Scale | BHD |
|---|---|---|---|---|
| 1 | 0.95 | 0.00 | 0.00 | 0.05 |
| 2 | 0.90 | 0.00 | 0.00 | 0.10 |
| 3 | 0.85 | 0.00 | 0.00 | 0.15 |
| 4 | 0.85 | 0.05 | 0.00 | 0.10 |
| 5 | 0.85 | 0.10 | 0.00 | 0.05 |
| 6 | 0.70 | 0.15 | 0.00 | 0.15 |
| 7 | 0.80 | 0.10 | 0.00 | 0.10 |
| 8 | 0.70 | 0.20 | 0.00 | 0.10 |
| 9 | 0.65 | 0.15 | 0.05 | 0.15 |
| 10 | 0.60 | 0.15 | 0.10 | 0.15 |
| 18 | 0.70 | 0.15 | 0.05 | 0.10 |
| 11 | 0.70 | 0.20 | 0.10 | 0.00 |
| 12 | 0.85 | 0.10 | 0.05 | 0.00 |
| 13 | 0.75 | 0.20 | 0.05 | 0.00 |
| 14 | 0.80 | 0.20 | 0.00 | 0.00 |
| 15 | 0.90 | 0.00 | 0.10 | 0.00 |
| 16 | 0.80 | 0.10 | 0.10 | 0.00 |
| 17 | 1.00 | 0.00 | 0.00 | 0.00 |
| 21 | 0.70 | 0.20 | 0.10 | 0.00 |
| 22 | 0.75 | 0.20 | 0.05 | 0.00 |
| 23 | 0.75 | 0.15 | 0.10 | 0.00 |
| 24 | 0.80 | 0.15 | 0.05 | 0.00 |
| 25 | 0.80 | 0.10 | 0.10 | 0.00 |
| 26 | 0.85 | 0.10 | 0.05 | 0.00 |
| 27 | 0.60 | 0.25 | 0.15 | 0.00 |

TABLE 2

Results of Binder Optimization Tests

| | | | | Drop # of Green Pellets | | | | Compression Strength of Fired Pellets, kN | | | |
|---|---|---|---|---|---|---|---|---|---|---|---|
| Sample # | Sample Details | Binder % | Moisture % | AVG | STDEV | MIN | MAX | AVG | STDEV | MIN | MAX |
| 11.0 | OF 70%-SI 20%-MS 10% | 0 | 10 | 5 | 0.7 | 4 | 6 | 3.6 | 1.1 | 1.7 | 4.8 |
| 11.1 | OF 70%-SI 20%-MS 10% | 0.25 | 10 | 5 | 1.4 | 3 | 7 | 5.2 | 1.2 | 3.7 | 7.3 |
| 11.2 | OF 70%-SI 20%-MS 10% | 0.5 | 10 | 5 | 2.0 | 3 | 7 | 4.2 | 1.0 | 3.2 | 6.2 |
| 11.4 | OF 70%-SI 20%-MS 10% | 1 | 10 | 5 | 1.0 | 4 | 6 | 4.1 | 0.8 | 2.3 | 5.1 |
| 12.4 | OF 85%-SI 10%-MS 5% | 1 | 10 | 5 | 0.7 | 4 | 6 | 4.3 | 0.6 | 3.7 | 5.5 |
| 11.4 | OF 70%-SI 20%-MS 10% | 1 | 10 | 17 | 1.95 | 14 | 19 | 5.9 | 3.8 | 1.5 | 8.2 |
| 11.5 | OF 70%-SI 20%-MS 10% | 1.25 | 10 | 16 | 2.39 | 13 | 19 | 5.8 | 3.8 | 1.2 | 7.7 |
| 11.6 | OF 70%-SI 20%-MS 10% | 1.5 | 10 | 82 | 2.41 | 79 | 85 | 4.3 | 2.8 | 0.9 | 6.2 |

TABLE 2-continued

Results of Binder Optimization Tests

| Sample # | Sample Details | Binder % | Moisture % | Drop # of Green Pellets | | | | Compression Strength of Fired Pellets, kN | | | |
|---|---|---|---|---|---|---|---|---|---|---|---|
| | | | | AVG | STDEV | MIN | MAX | AVG | STDEV | MIN | MAX |
| 11.8 | OF 70%-SI 20%-MS 10% | 2 | 10 | 79 | 2.65 | 77 | 86 | 4.3 | 2.2 | 1.2 | 6.1 |
| 12.4 | OF 85%-SI 10%-MS 5% | 1 | 10 | 12 | 1.48 | 10 | 14 | 6.4 | 4.8 | 1.0 | 8.0 |
| 13.6 | OF 75%-SI 20%-MS 5% | 1.5 | 10 | 17 | 1.67 | 14 | 18 | 4.8 | 3.8 | 0.8 | 6.4 |
| 14.5 | OF 80%-SI 20% | 1.25 | 10 | 17 | 2.24 | 14 | 20 | 6.1 | 4.2 | 0.9 | 7.7 |
| 15.6 | OF 90%--MS 10% | 1.5 | 10 | 19 | 2.00 | 17 | 22 | 5.8 | 3.9 | 1.1 | 7.2 |
| 16.6 | OF 80%-SI 10%-MS 10% | 1.5 | 10 | 22 | 4.15 | 17 | 28 | 3.6 | 2.6 | 0.8 | 5.2 |
| 17.4 | OF 100% | 1 | 10 | 8 | 0.45 | 7 | 8 | 8.7 | 7.4 | 1.2 | 10.9 |
| 17.6 | OF 100% | 1.5 | 10 | 21 | 1.95 | 19 | 24 | 5.1 | 3.4 | 1.1 | 7.2 |
| CVRD (ref) | | | | | | | | 3.9 | 2.1 | 0.9 | 5.0 |
| 21.6 | OF 70%-SI 20%-MS 10% | 1.5 | 8 | 17.8 | 2.64 | 4.2 | 1 | 1.8 | 0.91 | 4.2 | 1 |
| 22.6 | OF 75%-SI 20%-MS 5% | 1.5 | 8 | 22.4 | 3.98 | 5.8 | 2.6 | 4.2 | 0.81 | 5.8 | 2.6 |
| 23.6 | OF 75%-SI 15%-MS 10% | 1.5 | 8 | 11.6 | 4.18 | 4.4 | 2.4 | 3.6 | 0.66 | 4.4 | 2.4 |
| 24.6 | OF 80%-SI 15%-MS 5% | 1.5 | 8 | 15 | 2.79 | 3 | 1.2 | 2.3 | 0.86 | 3 | 1.2 |
| 25.6 | OF 80%-SI 10%-MS 10% | 1.5 | 8 | 14 | 2.88 | 6.4 | 3 | 4 | 1.17 | 6.4 | 3 |
| 26.6 | OF 85%-SI 10%-MS 5% | 1.5 | 8 | 8.8 | 1.17 | 6.4 | 5.6 | 5.8 | 0.26 | 6.4 | 5.6 |
| 27.6 | OF 60%-SI 25%-MS 15% | 1.5 | 8 | 14 | 4.15 | 20 | 8 | 5.6 | 0.2 | 8.4 | 5.4 |
| 21.6 | OF 70%-SI 20%-MS 10% | 1.5 | 8 | 17.8 | 2.64 | 4.2 | 1 | 1.8 | 0.91 | 4.2 | 1 |
| 22.6 | OF 75%-SI 20%-MS 5% | 1.5 | 8 | 22.4 | 3.98 | 5.8 | 2.6 | 4.2 | 0.81 | 5.8 | 2.6 |
| 23.6 | OF 75%-SI 15%-MS 10% | 1.5 | 8 | 11.6 | 4.18 | 4.4 | 2.4 | 3.6 | 0.66 | 4.4 | 2.4 |
| 24.6 | OF 80%-SI 15%-MS 5% | 1.5 | 8 | 15 | 2.79 | 3 | 1.2 | 2.3 | 0.86 | 3 | 1.2 |
| 25.6 | OF 80%-SI 10%-MS 10% | 1.5 | 8 | 14 | 2.88 | 6.4 | 3 | 4 | 1.17 | 6.4 | 3 |
| 26.6 | OF 85%-SI 10%-MS 5% | 1.5 | 8 | 8.8 | 1.17 | 6.4 | 5.6 | 5.8 | 0.26 | 6.4 | 5.6 |
| 27.6 | OF 60%-SI 25%-MS 15% | 1.5 | 8 | 14 | 4.15 | 20 | 8 | 5.6 | 0.2 | 8.4 | 5.4 |

The invention claimed is:

1. A process for the recycling of steel industry iron bearing by-products into a shape suitable for feeding into a direct reduction furnace, comprising the steps of:
   a) mixing and grinding 50 to 99 wt % of ore and pellet fines and 1 to 50 wt % of slurry, mill scale and/or bag house dust and adding less than 3 wt % binder to form a mixture;
   b) pelletizing the mixture to form pellets; and
   c) indurating the pellets obtained by heating these for 5 to 60 minutes at a temperature in the range of 1100 to 1350° C.

2. The process according to claim 1, wherein the steel industry iron by-products contain 50 to 97 wt % of ore and pellet fines, 1 to 50 wt % of slurry, 1 to 50 wt % of mill scale and 1 to 50 wt % of bag house dust.

3. The process according to claim 1, further comprising d) charging the pellets directly as feed into a direct reduction furnace.

4. The process according to claim 1, wherein the furnace is a direct reduction shaft furnace.

5. The process according to claim 3 comprising the additional step of e) reducing the pellets in the direct reduction furnace to obtain directly reduced iron and further processing of the iron.

6. The process according to claim 5, comprising the additional step of f) collecting by-products during reduction and further processing and feeding thereof at step a).

7. The process of claim 1, wherein the pellets have compression strength of at least 2.8 kN.

8. The process of claim 7, wherein the compression strength is at least 3.0 kN.

9. The process of claim 1, wherein the pellets have a drop number of at least 5.

10. A process for the recycling of steel industry iron bearing by-products into a shape suitable for feeding into a direct reduction furnace, comprising the steps of:
   a) mixing and grinding 48 to 97 wt % of ore and pellet fines and 1 to 50 wt % of slurry, 1 to 50 wt % of mill scale, and 1 to 50 wt % of bag house dust, and adding less than 3 wt % binder to form a mixture;
   b) pelletizing the mixture to form pellets; and
   c) indurating the pellets obtained by heating these for 5 to 60 minutes at a temperature in the range of 1100 to 1350° C.

11. The process of claim 10, wherein the pellets have compression strength of at least 2.8 kN.

12. The process of claim 10, wherein the pellets have a drop number of at least 5.

* * * * *